(12) United States Patent  
Thomas

(10) Patent No.: US 8,949,251 B2
(45) Date of Patent: Feb. 3, 2015

(54) SYSTEM FOR AND METHOD OF IDENTIFYING CLOSELY MATCHING TEXTUAL IDENTIFIERS, SUCH AS DOMAIN NAMES

(75) Inventor: Matthew Thomas, Lausanne (CH)

(73) Assignee: Verisign, Inc., Reston, VA (US)

( * ) Notice: Subject to any disclaimer, the term of this patent is extended or adjusted under 35 U.S.C. 154(b) by 227 days.

(21) Appl. No.: 12/763,349

(22) Filed: Apr. 20, 2010

(65) Prior Publication Data

US 2011/0258237 A1    Oct. 20, 2011

(51) Int. Cl.
*G06F 7/00* (2006.01)
*G06F 17/30* (2006.01)
*H04L 29/12* (2006.01)

(52) U.S. Cl.
CPC .... *G06F 17/30887* (2013.01); *G06F 17/30985* (2013.01); *H04L 29/12066* (2013.01); *H04L 29/12641* (2013.01); *H04L 61/1511* (2013.01); *H04L 61/3025* (2013.01)
USPC ........................................................ 707/749

(58) Field of Classification Search
CPC ................................................ G06F 17/30985
USPC ........................................................ 707/749
See application file for complete search history.

(56) References Cited

U.S. PATENT DOCUMENTS

| 2002/0103820 A1* | 8/2002 | Cartmell et al. ............... 707/500 |
| 2006/0253612 A1 | 11/2006 | Cheshire |
| 2008/0005127 A1* | 1/2008 | Schneider ....................... 707/10 |
| 2008/0059607 A1 | 3/2008 | Schneider |
| 2008/0235383 A1* | 9/2008 | Schneider ..................... 709/229 |
| 2010/0005191 A1 | 1/2010 | Drako et al. |

OTHER PUBLICATIONS

International Search Report and Written Opinion for Int'l. Appln. No. PCT/US2011/032089, mailed Jun. 15, 2011 (14 pages).
PCT Officer Philippe Becamel, International Preliminary Examination Report and Written Opinion, dated Nov. 1, 2012, PCT Application No. PCT/US2011/032089, filed Apr. 12, 2011, pp. 1-8, published by WIPO.

* cited by examiner

*Primary Examiner* — Ajith Jacob
(74) *Attorney, Agent, or Firm* — MH2 Technology Law Group, LLP

(57) ABSTRACT

Methods and systems provide tracking or logging requests to resolve non-existent domain (NXDomains) and organizing the NXDomains to support searching of the domain names including ranking the NXDomains based on popularity, e.g, number of hits or potential traffic based on the number of requests made for the NXDomain. NXDomain logs may be organized so that it supports searching by creating an inverted index including n-grams of the NXDomains. Searching includes identifying a target substring in one or more of the indexes, selecting those matching NXDomains satisfying some threshold criteria, and displaying the NXDomains in a selected order such as by demand or popularity associated with, for example, a selected geographical location from which resolution requests targeting respective NXDomains originate.

10 Claims, 17 Drawing Sheets

10-20-2009:22.01.21:tko2:113.142.10.14:pozyq.com.:A
10-20-2009:22.05.33:tko2:216.240.130.59:kalpakianmd.com.:A
10-20-2009:22.13.12:tko2:216.240.130.59:kalpana-asok.com.:A
10-20-2009:22.42.03:tko2:83.49.126.188:ifecltko.net.:A
10-20-2009:22.55.25:tko2:113.142.10.13:fpuvet.com.:A
10-20-2009:22.56.13:tko2:202.96.136.231:younyshiny.com.:A
10-20-2009:22.57.04:tko2:113.142.10.14:qdping.com.:A
10-20-2009:22.58.07:tko2:66.133.150.37:jrrination.com.:A
10-20-2009:22.13.02:tko2:60.254.209.155:kaicn.com.:A
10-20-2009:22.25.05:tko2:116.113.84.26:wzqejb.com.:A
10-20-2009:22.26.43:tko2:60.215.138.62:china-longyang.com.:A
10-20-2009:22.26.23:tko2:113.142.10.13:gdopus.com.:A
10-20-2009:22.34.16:tko2:113.142.10.14:qdqtl.com.:A
10-20-2009:22.43.13:tko2:113.142.10.14:qdprt.com.:A

```
901 ──┐   911    912    913    914    915
902 ── H      O      T      P      A      D      (6)
903 ── HO     OT     TP     PA     AD            (5)
904 ── HOT    OTP    TPA    PAD                  (4)
905 ── HOTP          OTPA          TPAD          (3)
906 ── HOTPA         OTPAD                       (2)
       HOTPAD                                    (1)

Number of permutations
(N*(N+1))/2
```

FIG. 9

```
Set domainTokens (String aDomain) {

Set tokens
Int minPartition, maxPartition while (minPartition <= maxPartition) {
            for (i=0; i + minPartition <= aDomain.length; i++) {
                        tokens.add(aDomain.substring(i, minPartition+1)
            }
            minPartition++
}

Map: (Domain, NXD Record) → List<Domain, "1">

Reduce: (Domain, List<1,1,1...>) → List<Domain, HitCount>

Map: (Domain, HitCount> → List<Token, (Domain, HitCount)>

Reduce: (Token, List<(Domain, HitCount)>) → List(SearchKeyword, List<SortedDomainsByHitCount>)

SYSTEM FOR AND METHOD OF IDENTIFYING CLOSELY MATCHING TEXTUAL IDENTIFIERS, SUCH AS DOMAIN NAMES

TECHNICAL FIELD

The following disclosure relates generally to identifying and providing information associated with text and other strings and other identifiers closely matching a specified target text string, and more particularly to determining textual identifiers such as non-registered and non-existent domain names that partially or entirely incorporate or otherwise closely match a specified text string and providing data associated with the identified non-registered domain names.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, the domain name for a hypothetical computer system operated by IBM Corporation may be "comp23.IBM.com". Using domain names, a user attempting to communicate with this computer system could specify a destination of "comp23IBM.com" rather than the particular IP address of the computer system (e.g., 198.81.209.25).

A user can also request a particular resource (e.g., a Web page or a file) that is available from a server computer by specifying a unique Universal Resource Indicator ("URI"), such as a Uniform Resource Locator ("URL"), for that resource. A URL includes a protocol to be used in accessing the resource (e.g., "http:" for the HyperText Transfer Protocol ("HTTP")), the domain name or IP address of the server that provides the resource (e.g., "comp23IBM.com"), and optionally a path to the resource (e.g., "/help/HelpPage.html")—thus "http://comp23IBM.com/help/HelpPage.html" is one example of a URL. In response to a user specifying such a URL, the comp23IBM.com server would typically return a copy of the "HelpPage.html" file to the user.

In addition to making the identification of destination computer systems more mnemonic, domain names introduce a useful layer of indirection between the name used to identify a destination computer system and the IP address of that computer system. Using this layer of indirection, the operator of a particular computer system can initially associate a particular domain name with a first computer system by specifying that the domain name corresponds to the IP address of the first computer system. At a later time (e.g., if the first computer system breaks or must be replaced), its operator can "transfer" the domain name to a second computer system by then specifying that the domain name corresponds to the IP address of the second computer system.

The domain names in DNS are structured in a hierarchical, distributed database that facilitates grouping related domain names and computers and ensuring the uniqueness of different domain names. In particular, as mentioned above, a particular domain name such as "IBM.com" may identify a specific host computer. However, the hierarchical nature of DNS also allows a domain name such as "IBM.com" to represent a domain including multiple other domain names each identifying computers (also referred to as "hosts"), either in addition to or instead of identifying a specific computer.

FIG. 20 illustrates a hypothetical portion of the DNS database 2000 in which the node representing the IBM.com domain name 2010 is the root node in an IBM.com domain 2050 that includes 7 other nodes each representing other domain names. Each of these domain names in the IBM.com domain can be, but do not have to be, under the control of a single entity (e.g., IBM Corporation). FIG. 20 also includes a WebHostingCompany.com domain 12055 that includes a single domain name.

As illustrated, the DNS database can be represented with a hierarchical tree structure, and the full domain name for a given node in the tree can be determined by concatenating the name of each node along the path from the given node to the root node 2001, with the names separated by periods. Thus, the 8 nodes in the IBM.com domain represent the domain names IBM.com 2010, foo.IBM.com 2012, foo.foo.IBM.com 2018, bar.foo.IBM.com 2020, bar.IBM.com 2014, comp23IBM.com 2016, abc.comp23IBM.com 2022, and cde.comp23IBM.com 2024. Other ".com" domain names outside the IBM.com domain are also illustrated in FIG. 20, including the second-level domain names BCD-Corp.com 2032, WebHostingCompany.com 2034, 1-800-555-1212.com 2042 and 123456.com 2044, and the lower-level domain names 123.123456.com 2046 and 456.123456.com 2048. In addition to the ".com" top-level domain ("TLD"), other TLDs are also illustrated including the ".cc" geographical TLD and the ".gov", ".edu" and ".mil" organizational TLDs. Illustrated domain names under these other TLDs include Stanford.edu 2036, Berkeley.edu 2038, and RegistrarCompany.cc 2040.

New domain names can be defined (or "registered") by various domain name registrars. In particular, a company that serves as a registrar for a TLD can assist customers in registering new domain names for that TLD and can perform the necessary actions so that the technical DNS information for those domain names is stored in a manner accessible to name servers for that TLD. Registrars often maintain a second-level domain name within the TLD (e.g., a hypothetical Registrar Company that acts as a registrar for the ".cc" TLD could maintain the RegistrarCompany.cc domain name 2040), and provide an interactive Website at their domain name from which customers can register new domain names. A registrar will typically charge a customer a fee for registering a new domain name.

For the ".com", ".net" and ".org" TLDs, a large number of registrars currently exist, and a single shared registry ("the Registry") under the control of a third-party administrator stores information identifying the authoritative name servers for the second-level domain names in those TLDs. Other TLDs may have only a single registrar, and if so that registrar could maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD—if so, the secondary or affiliate registrars for that TLD supplies the appropriate DNS information for the domain names that they register to the primary registrar. Thus, the manner in which the DNS information for a TLD is obtained and stored is affected by the registrars for that TLD.

While the DNS system provides many benefits, various problems exist. For example, there are currently a limited number of TLDs, and many available domain names in the most popular TLDs (e.g., ".com") have already been taken. Thus, users will often have difficulty identifying available or non-registered domain names, i.e., domains that therefore do not exist in the authoritative registry for the TLD, that are "non-existent domains" also termed NXDomains or NXDs. A user may, instead, often attempt to register domain names that are already registered. In such a situation, the user will be prevented from registering the domain name, but may receive little or no assistance in determining other domain names that are available. For example, the user will typically have to identify other domain names to consider without assistance. If the user is able to identify any other domain names, it is then difficult for the user to determine whether those other domain names are available. Typically, the user will need to attempt to register each of those other domain names one-at-a-time to determine if they are available. This is a time-consuming and inefficient process.

SUMMARY

Embodiments of various aspect of the present invention include methods, software and apparatus for tracking or logging requests to resolve non-existent domain (NXDomains) and organizing the NXDomains to support searching of the domain names including ranking the NXDomains based on one or more selected criteria such as domain popularity, e.g, number of hits or potential traffic based on the number of requests made for the NXDomain. NXDomains (or NXD) is a term used for the Internet domain name that is unable to be resolved using the DNS implementation owing either to the domain name not yet being registered or a server problem. The reference to the NXDOMAIN is published in RFC 1035 (Domain names—implementation and specification) and also in RFC 2308, both of which are incorporated herein by reference in their entireties. Organizing the NXDomain log so that it supports searching may include creating an inverted index including n-grams of the NXDomains.

According to one aspect of the invention, a computer-implemented method of identifying a set of textual identifiers (e.g., NXDomains) includes receiving a plurality of requests to resolve a plurality of textual identifiers; maintaining a log of requests to resolve unresolvable textual identifiers; identifying a unique identifier set of unique unresolvable textual identifiers in the log; parsing the log for each identifier within the identifier set and counting the numbers of unique requests for each textual identifier and, optionally, retrieving geolocation information based on auxiliary identifiers (e.g.: IP addresses) associated with each of the textual identifiers to populate a first mapping of unique identifiers to their corresponding unique requests (and aggregated geolocation information); tokenizing to create a list including tokens (e.g., n-grams) for each of the unique identifiers contained within the first mapping; mapping the tokens to corresponding unique unresolvable textual identifiers to populate a second mapping of tokens to a list of unique unresolvable textual identifiers with their corresponding number of unique requests and aggregated geolocation information; and sorting the second mapping according to numbers of unique requests associated with each of the tokens.

According to another aspect of the invention, a computer-implemented method of identifying a set of textual identifiers includes receiving a keyword and, optionally, additional parameters (e.g., date range); based on any optional parameters (e.g. the date range), selecting corresponding indexes of tokens satisfying the parameters; searching the selected indices for tokens matching the keyword to populate a first mapping of dates within the date range to matching lists of matching identifiers present in the selected corresponding indice; sorting the mapping according to the some sort criterion such as dates within the date range and eliminating potential matches that fail to satisfy a criterion (e.g., minimum or maximum string length or numbers of hits); inverting the first mapping to populate a second mapping of unique identifiers and to corresponding unique requests and aggregated geolocation information; summing for sets of identifiers, e.g., for each day in mapping, counts of numbers of unique requests for each identifier and aggregate geolocation information into a third mapping of unique identifiers and their associated summed requests and aggregated geolocation data; sorting the third mapping according to the summed requests and aggregated geolocation data and, optionally, eliminating potential matches that fail to satisfy a criterion; and returning a display list including a sorted mapping of the third mapping.

Other aspects of the invention include software and devices for implementing methods according to the invention.

BRIEF DESCRIPTION OF THE DRAWINGS

FIG. 9 is a depiction of calculating all possible n-grams for a given domain name.

FIG. 10 is a block of pseudocode used to create all possible n-grams for a given domain name;

DETAILED DESCRIPTION

The following detailed description of the invention refers to the accompanying drawings. While the description includes exemplary embodiments, other embodiments are possible and changes may be made to the embodiments described without departing from the spirit and scope of the invention. The following detailed description does not limit the invention. Instead, the appended claims and their equivalents define the scope of the invention.

A system, computer implemented method and software facility are described that provides a means of searching for relevant domain names and ranking the resulting matches. Although embodiments described are directed to non-existent domains (NXDomains or NXDs), other embodiments may include organizing and searching for close matches in other databases of symbol and character strings, particularly those representing addresses and similar collections of information. In particular, embodiments of the invention are applicable to organize logged data in accordance with some criteria (e.g., number of hits representing demand) and support searching of the data for close matches, such as data incorporating a search string. Embodiments further include providing search results ranked based on the criteria. Thus, for illustrative purposes, some embodiments of a software facility are described below in which domain names are retrieved and ranked for a specified keyword within the NXDomain dataset. However, those skilled in the art will appreciate that the techniques of the invention can be used in a wide variety of other situations, including any situation in which a keyword is used to search and rank results from a set of textual identifiers.

In particular, the Domain Search Engine Provider (DSEP) system is an example embodiment of the software facility in which a set of sorted and matching domain names are determined and presented to a user, such as after the user has issued a query for a given keyword. Those skilled in the art will appreciate that this example system could also be used for purposes other than searching for non-registered or non-existent domain names, such as for presenting a set of results to a user who desires to observe multiple or all domain names that contain a given keyword and are registered.

Figure 1:
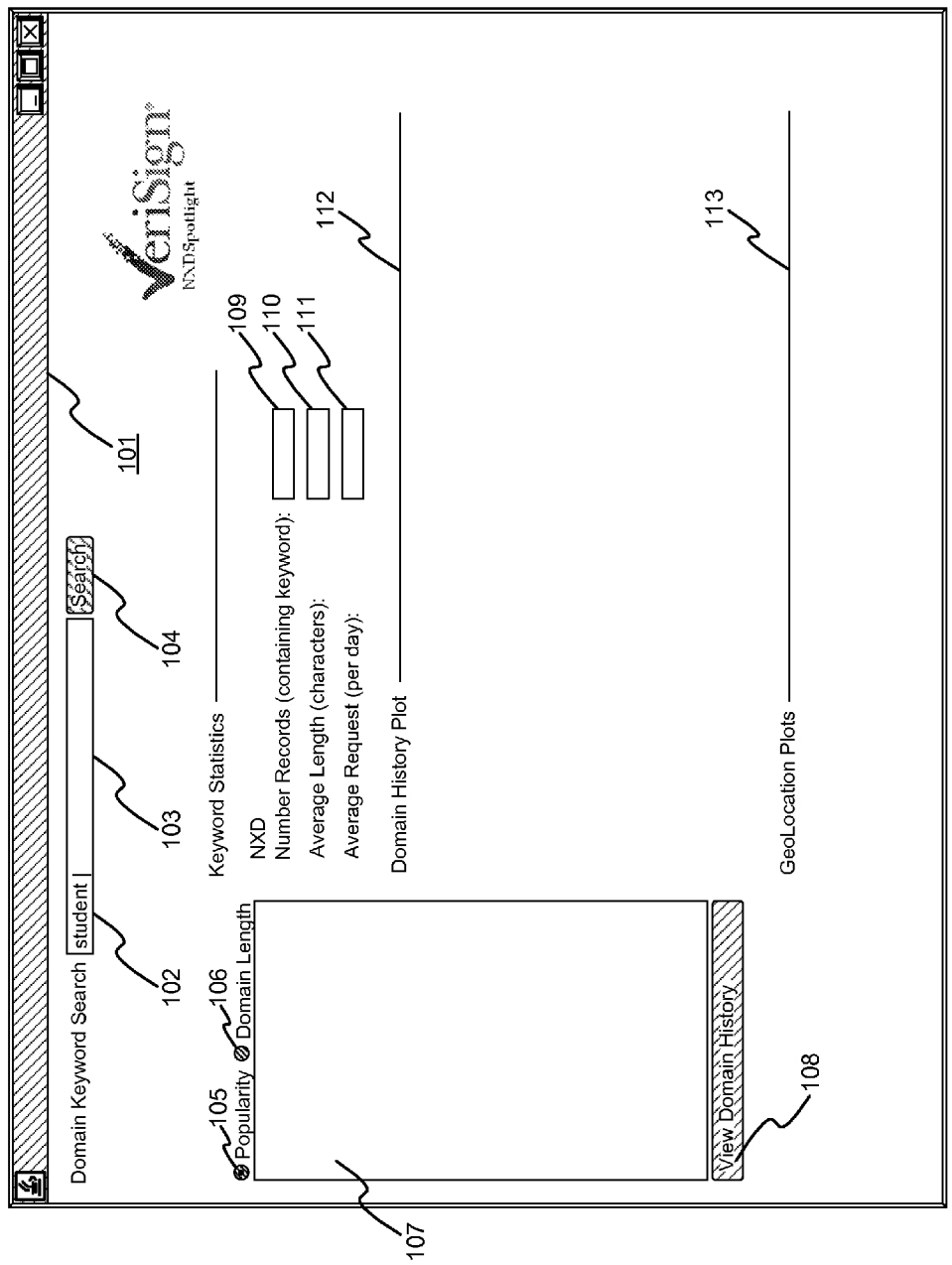
FIGS. 1-5 illustrate using an example "Domain Search Engine Provider" system to obtain domain names that are ranked and match a given keyword as well as providing historical analysis figures of demand and geolocation.

As an illustrative example of the use of the DSEP system consider the domain search request illustrated in FIG. 1, in which the user has requested to search for the term "student" as displayed at 102 using the search field 103. In this example, a user is interacting with a Web browser program on a client computer that has a Web page 101 displayed. Web page 101 is an interactive domain name search page provided by a registrar for any or multiple top level domains (TLDs.)

Figure 2:
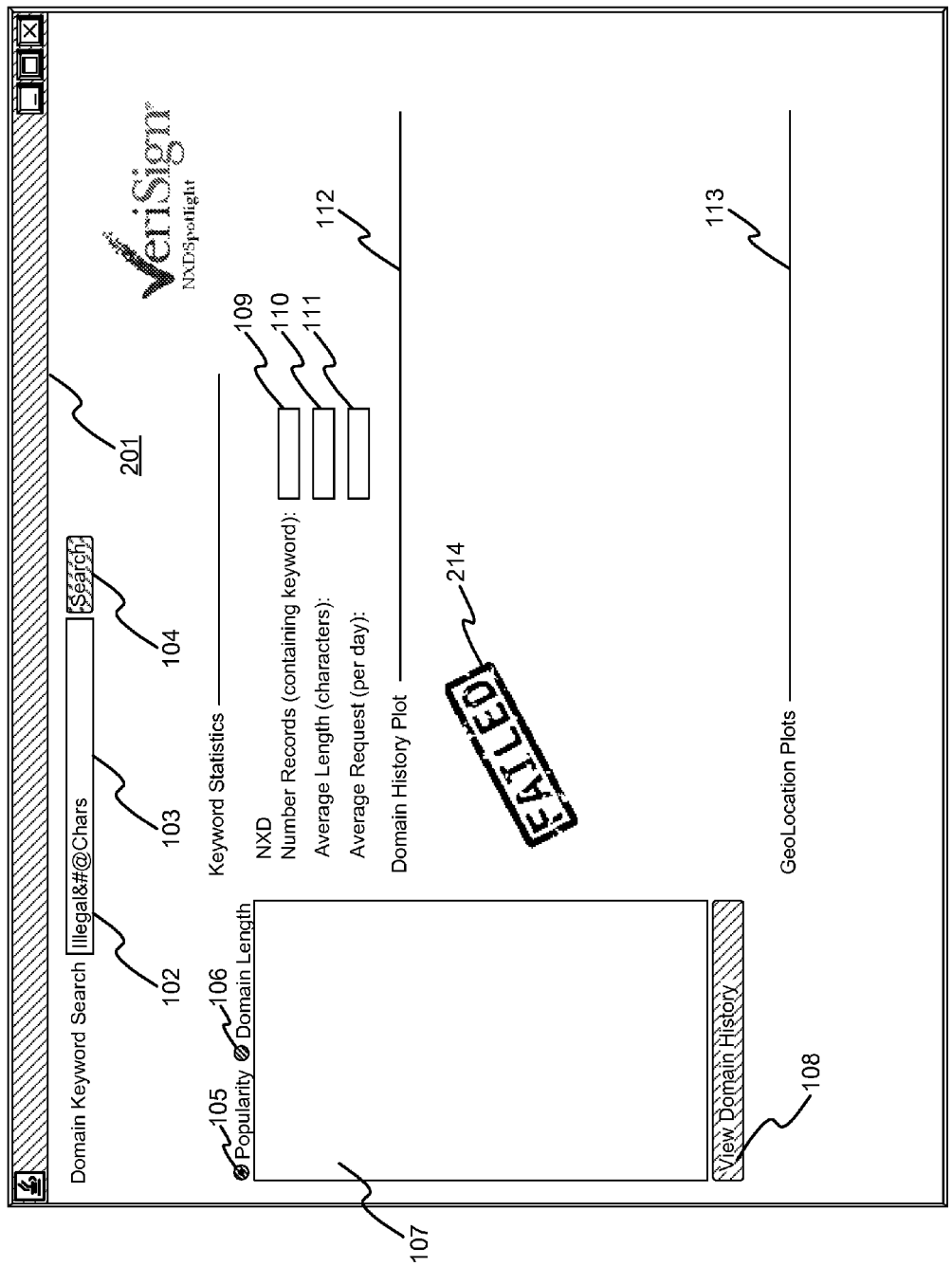

FIG. 2 illustrates an alternative scenario in which the search string is invalid as containing an illegal character resulting in display of an error message 214.

Figure 3:
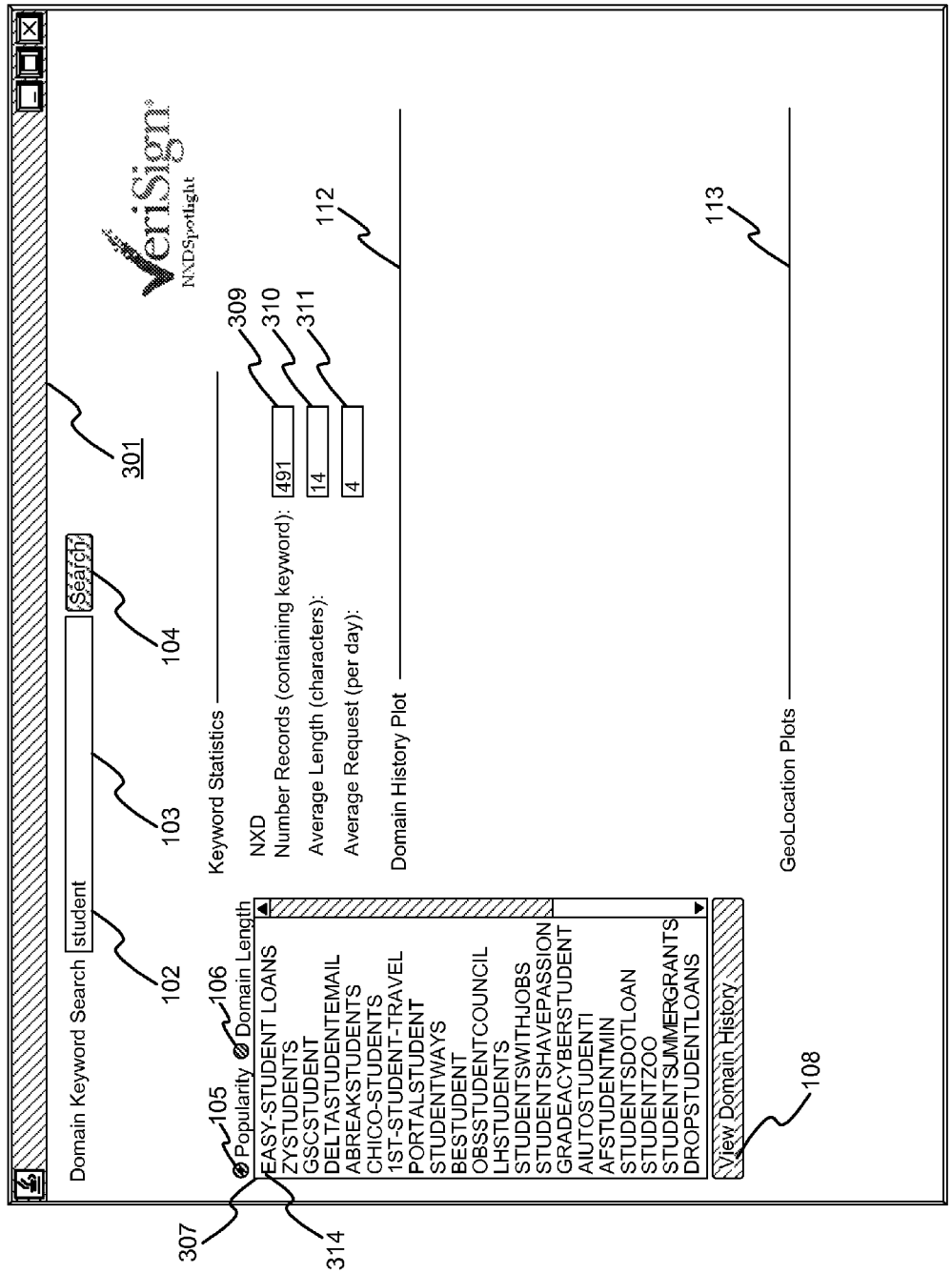

In response to the query request, the user receives a response in the form of web page 301 that is illustrated in FIG. 3. In particular, as is illustrated in FIG. 3, the Web page provides a set of matching results 307 for the given query. For example, the Web page includes a group of matching domain names for the given term in which the group is sorted by a particular selectable criteria, e.g., popularity 105 or domain name string length 106. In the example shown, the returned set of domains are sorted by popularity 105 but could be sorted by other means such as domain length 106. Additional statistics about the term search may also be presented and displayed to the user. For instance, the term "student" has been observed in 491 domains as shown by 309. The average domain length of all matching domains is 14 characters long as shown at 310 and the average number of unique IP requests for a domain containing the term is 4 requests as shown at 311.

Figure 4:
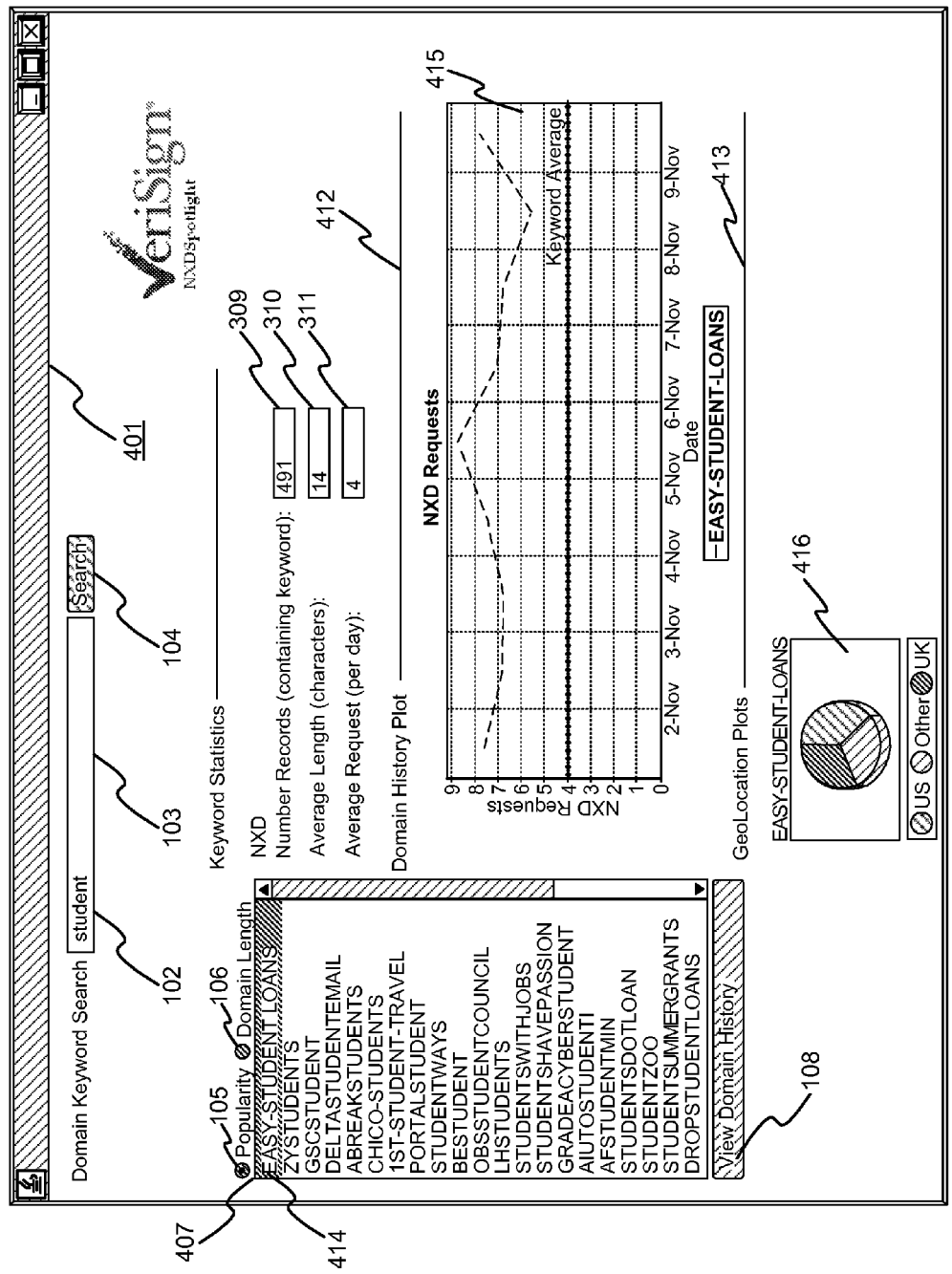
Figure 6:
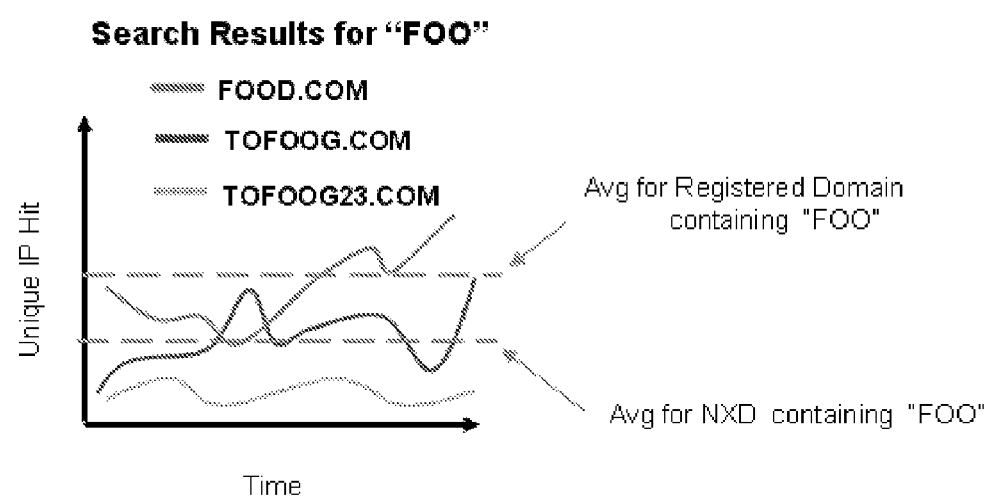
FIG. 6 illustrates an example of using distilled historical data over time to calculate demand.

The user can interact with the DSEP system and select one of the returned matches 407 (FIG. 4) by clicking on the domain and requesting the domain history 108. A proposed embodiment of a visual means of depicting previous domain demand is shown in FIG. 6. By counting unique IP hits over a period of time, it is possible to depict the amount of demand for a given domain. This concept may be used within the DSEP system and a visual plot of demand 415 is returned for a selected domain 414. Additionally, a proposed embodiment of depicting demand on a geo-location basis is illustrated by pie chart 416. By utilizing geolocation databases, the requesting IP address may be queried to construct a measure of demand for the selected domain generated from a specific geolocation.

Figure 5:
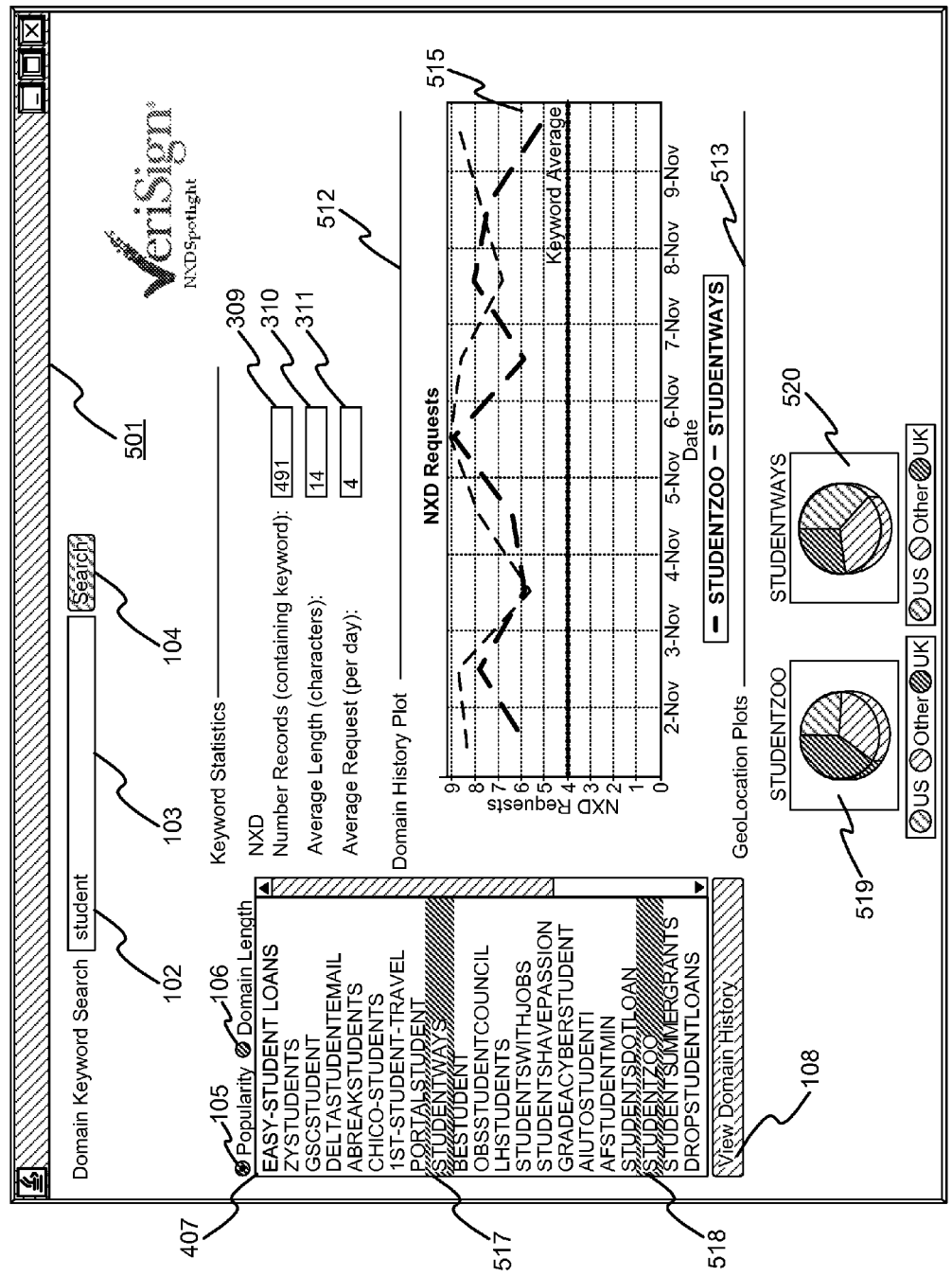

The proposed embodiment of the DSEP system also illustrates the capability of selecting multiple search results 517 and 518 (FIG. 5) and to provide a comparison of their historical datasets using the techniques previously discussed and shown in areas 512 and 513.

FIG. 6 illustrates an example of using distilled historical data over time to calculate demand. In this illustration, a search term of "FOO" results in identification of various NXDomains that incorporate the substring "FOO", including FOOD.COM, TOFOOG.COM, and TOFOO23.COM, the latter three satisfying some criteria (e.g., some minimum or threshold number of hits from some specified geographical area or geo-location as determined by requesting IP addresses) and are selected for display. The display may include a graph of unique IP hit counts over some period of time for each of the identified and selected NXDomains together with, for example, the average hit count for NXDomains containing the substring "FOO" and the average hit count for registered domains containing "FOO."

Figures 7, 8:
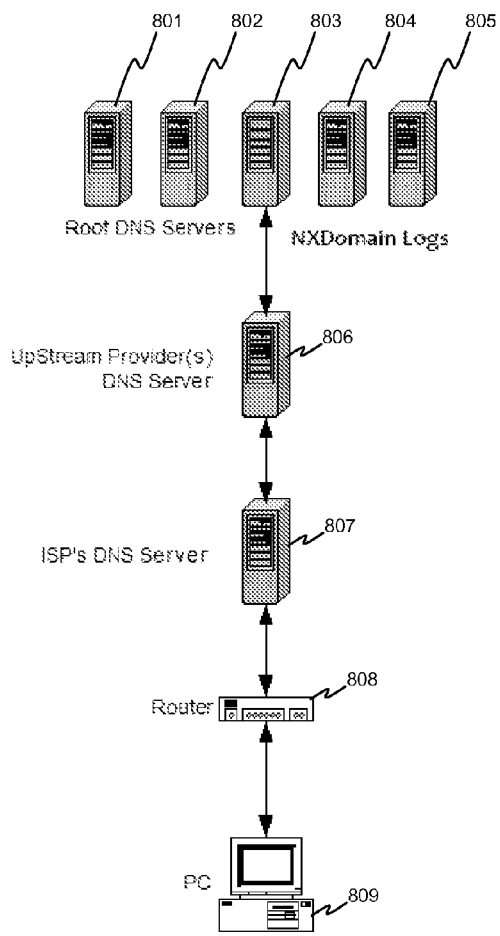
FIG. 7 is an example of raw NXDomain log data collected from authoritative root DNS servers.
FIG. 8 is a network diagram illustrating interconnected network devices and Domain Name System information.

FIG. 7 is an example of raw NXDomain log data collected from authoritative root DNS servers. Each line in the illustrated log represents an unresolved resolution request for an NXDomain including date and time of the request, the IP address of the requestor, i.e., the NXDomain and other data/information specified or permitted by the applicable standard.

FIG. 8 is a network diagram illustrating interconnected network devices and Domain Name System information. Root DNS Servers 801 and 802 and NXDomain Log Servers 804 and 805 interface with server 803 to service requests from Upstream Provider DNS Server 806. DNS Server 806 is accessed by ISP DNS Server 807 to service requests initiated by, for example, PC 809 running a suitable client (e.g., web browser) connecting through Router 808.

Referring to FIG. 9, a popular statistical model for comparing two words for similarity of spelling involves comparing their character string. A sequence of n characters is typically called a character n-gram. For "HOTPAD" there are the 0-gram " ", the unigrams "H", "O", "T", "P", "A", "D"; the bigrams "HO", "OT", "TP", "PA", "AD"; the trigrams "HOT", "OTP", "TPA", "PAD"; the 4-gram "HOTP", "OTPA", "TPAD"; etc. These n-grams are shown in FIG. 9. N-grams can also be used for efficient approximate matching.

By converting a sequence of items to a set of n-grams the n-grams improve retrieval in information retrieval systems to find similar target strings or documents given a single query string and a database of reference.

Figures 11, 12:
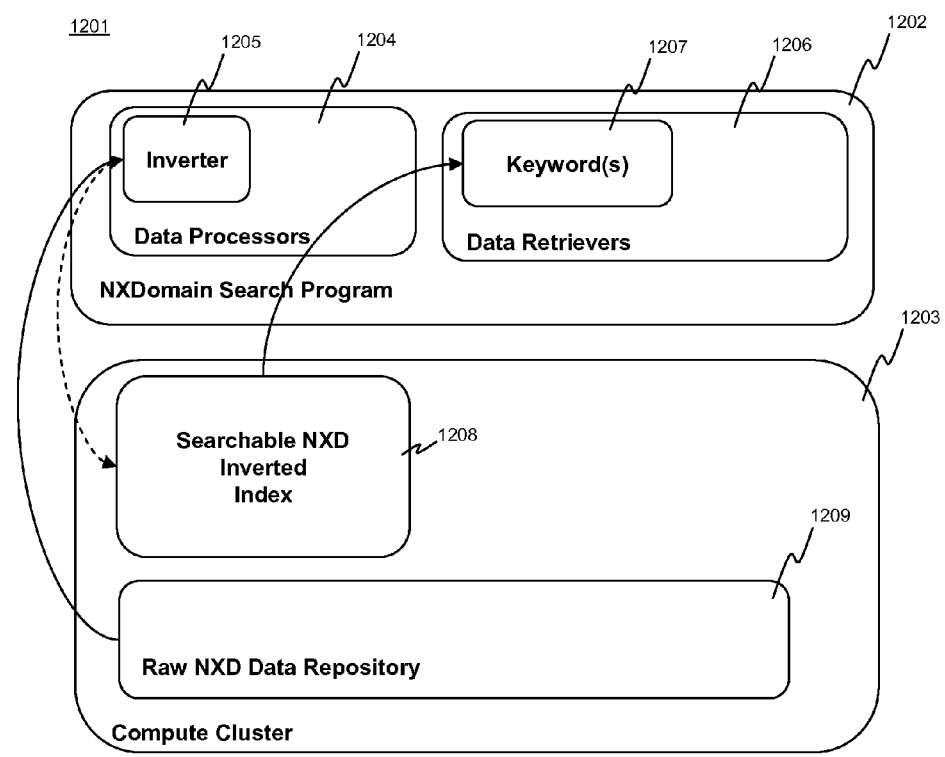
FIG. 11 is a high-level flow diagram of a method of creating a searchable index using a tokenization method and a processing framework such as MapReduce.
FIG. 12 is a block diagram illustrating an embodiment of the disclosed Domain Search Engine Provider system.

FIG. 10 is a block of pseudocode used to create all possible n-grams for a given domain name. FIG. 11 is a block of pseudocode for creating a searchable index using the tokenization algorithm and using a processing framework such as MapReduce; FIG. 12 is a block diagram illustrating an embodiment of the disclosed "Domain Search Engine Provider" or DSEP system. As depicted therein, DSEP 1201 includes a NXDomain Search Program 1202 and a Compute Cluster 1203. NXDomain Search Program 1202 includes Data processors 1204 having an Inverter 1205 and Data Retrievers 1206 including Keyword(s) 1207. Computer Cluster 1203 includes Searchable NXD Inverted index 1208 and Raw NXD Data Repository 1209.

Figure 13:
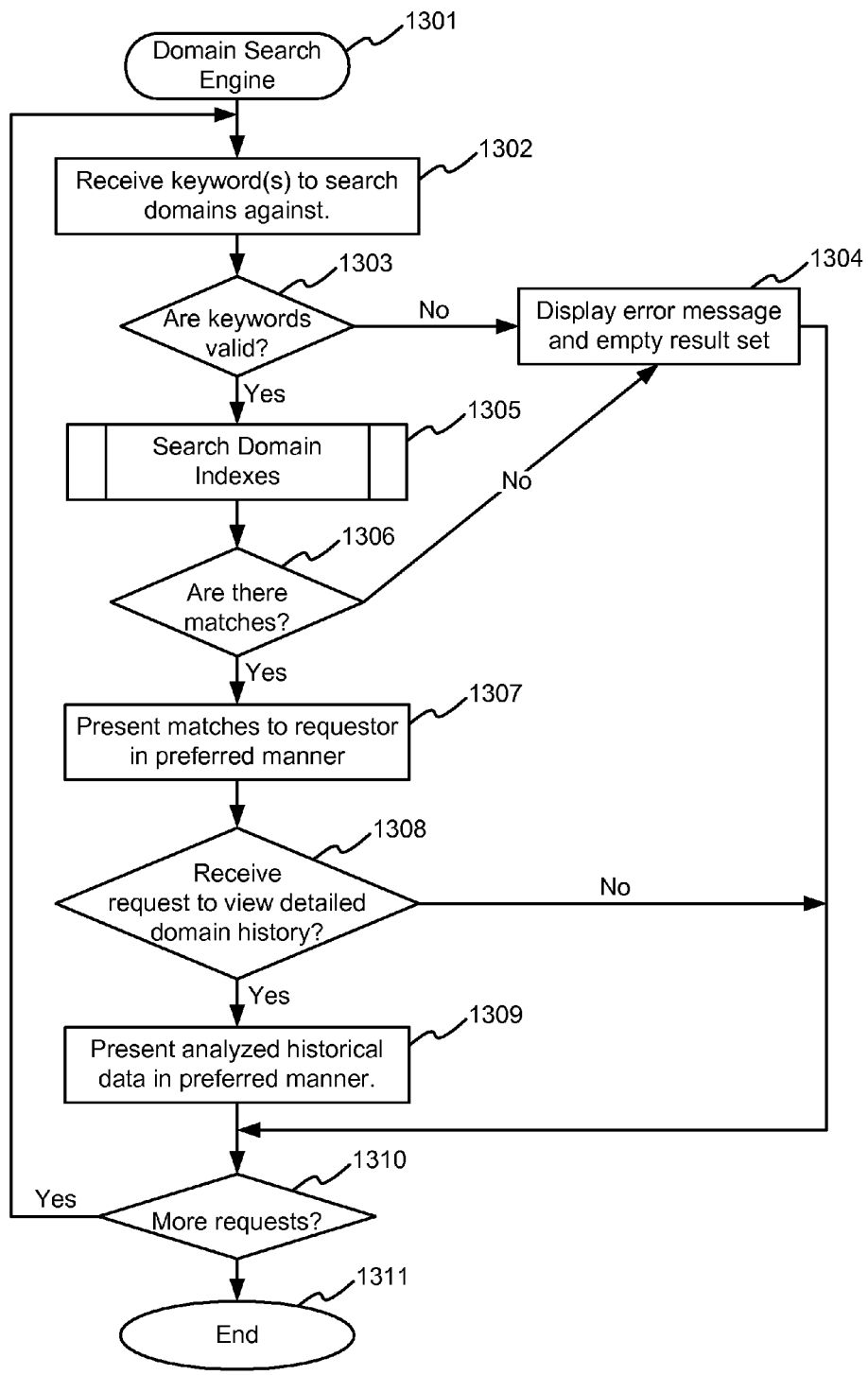
FIG. 13 is a flow diagram of an embodiment of the disclosed Domain Search Engine Provider system.

FIG. 13 is a flow diagram illustrating operation of an embodiment of a DSEP system. Domain Search Engine 1301 receives one or more keywords at step 1302 that are to be the basis of identifying target domains, e.g., NXDomains including all or some portion of the keyword(s) or otherwise closely matching the keyword(s). At step 1303 a check is made to determine if the keyword(s) is (are) valid, i.e., satisfy some criteria such as being sufficiently distinct to accommodate a valid and meaningful search, do not contain any invalid characters, etc. If the keywords are not valid, then an error message is generated at step 1304 and an empty result set is defined. If the keywords are valid, then processing continues at step 1306 to determine if there are any matches, e.g., NXDomains including one or more of the keywords. If no domain names are found in the various domain indexes, then processing continues at 1304 to display an error message. If matches are found at 1306, then the results are presented to the requestor in some predetermined or preferred manner and/or sort order. A user may also request to see a detailed view of the domain history at 1308 and, if requested, an analyzed historical data is provided in some displayable presentation format and preferred manner at step 1309. If more search requests are made at 1310, then processing continues at 1302 and otherwise ends at 1311.

Figure 14:
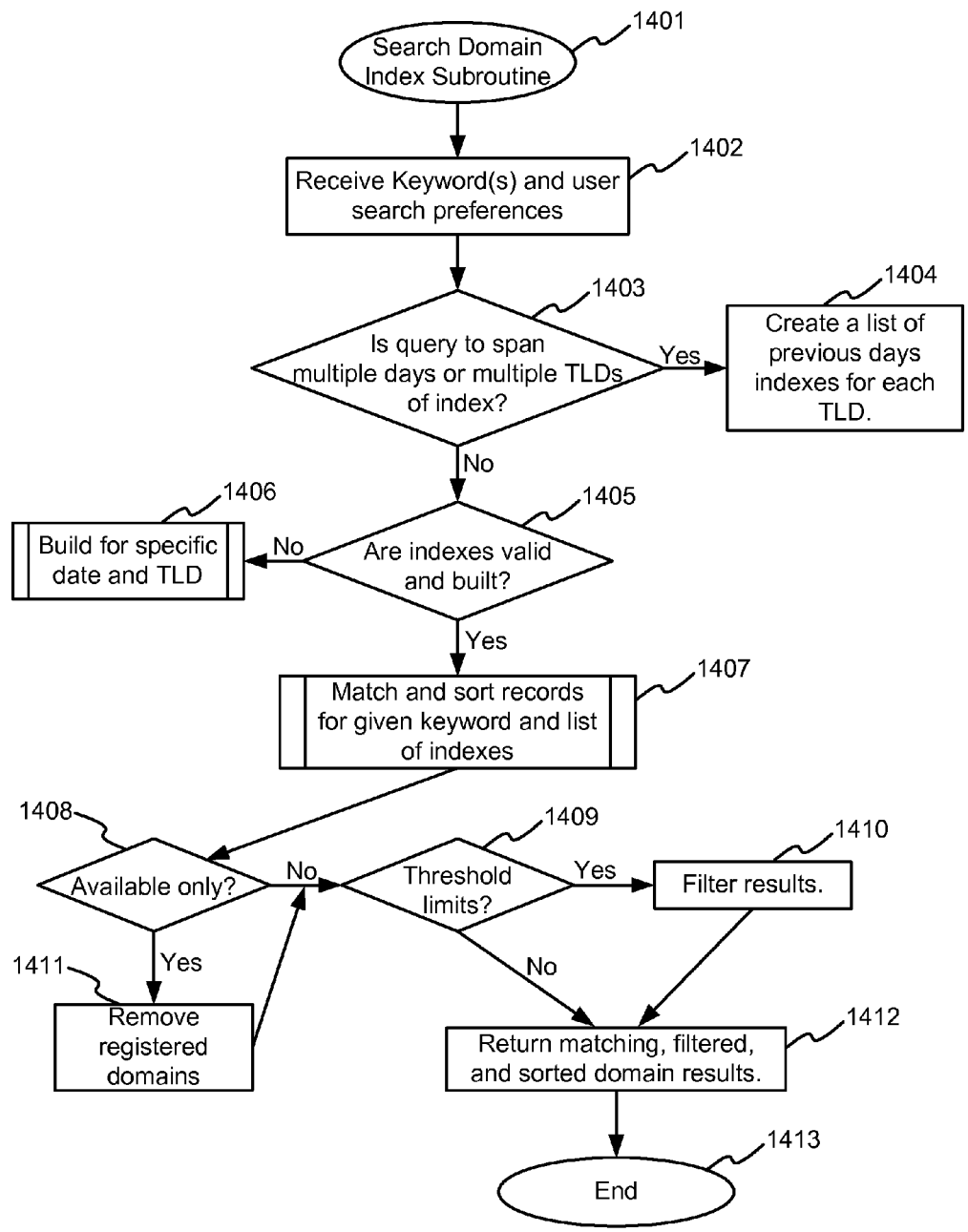
FIG. 14 is a flow diagram of an embodiment of the Search Domain Index subroutine.

FIG. 14 is a flow diagram of an embodiment of the Search Domain Index subroutine. A search domain index subroutine begins at 1401 with keywords and user search preferences received at 1402. A check is performed at 1403 to determine if the inquiry spans multiple days or multiple top level domains (TLDs) of the index. If either is true, a list is created of previous indexes for each TLD at 1404. Otherwise, a check is performed at 1405 to determine if the indexes are valid and exist, i.e, have been built. If a valid index is not available, then processing continues at 1406 to build an index for the specified date and TLD. If the indexes are valid and built, then processing continues at 1407 where matching and sorting of records occurs for the given keyword(s) and list of indexes. A check is performed at 1408 to see if the results contain only available domains. If registered domains are identified (i.e., domains that are not available), they are removed from the list of indexes at step 1411. Another check is performed at 1409 to see if threshold limits have been defined. If threshold limits are defined, then the results are filtered accordingly at 1410. At step 1412, matching, filtered and sorted domain results are returned and processing ends at 1413.

Figure 15:
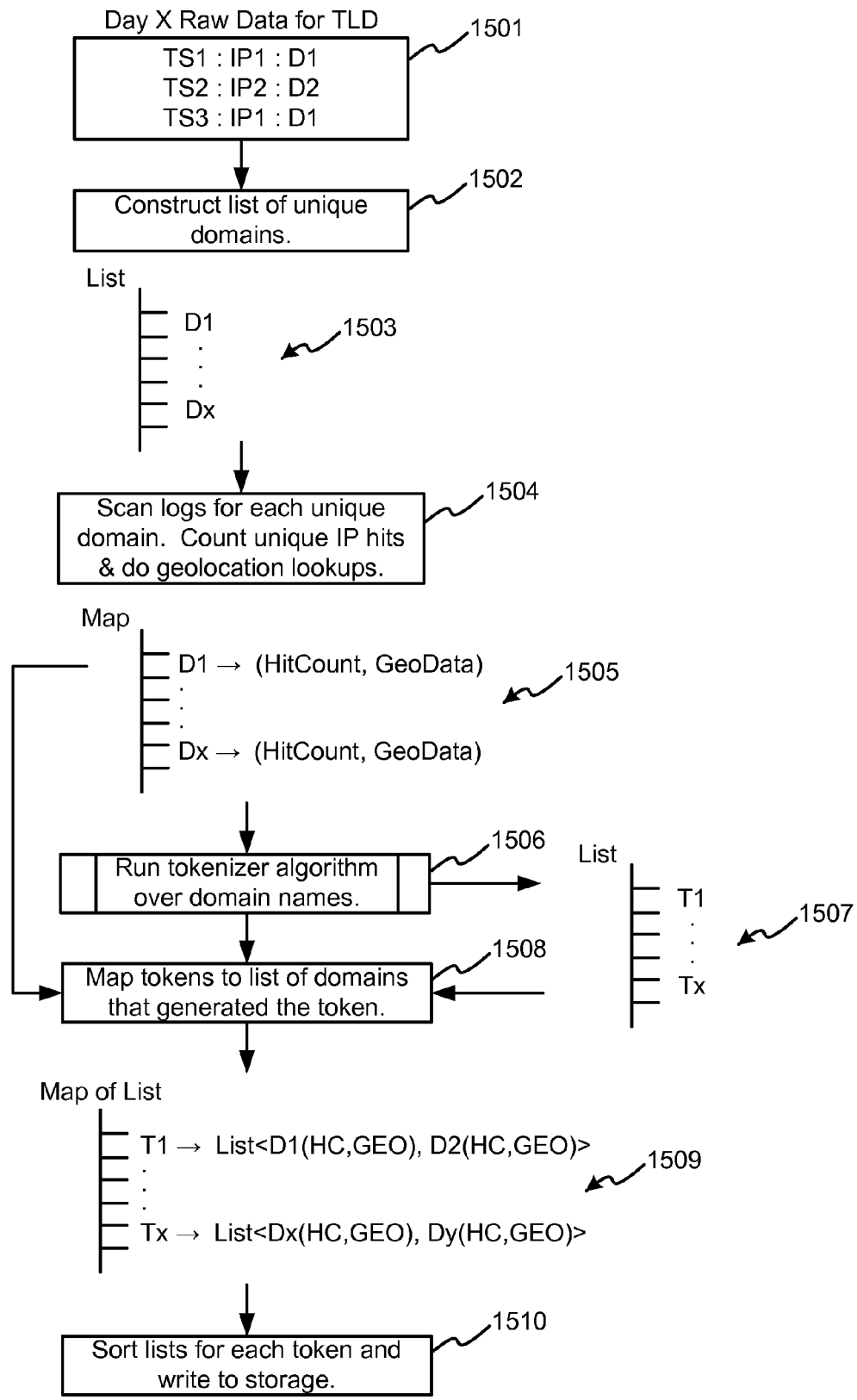
FIG. 15 is a diagram of an embodiment of the Build Index subroutine.

FIG. 15 depicts a method of creating an inverted index using the n-gram tokenization technique illustrated in FIG. 9 on a set of NXDomain records FIG. 7. For the purpose of generalizing the process, the log format has been simplified to a "TS:IP:D" format, which respectively represent a TimeStamp, IP Address, and Domain, as shown in 1501.

To begin this process, a list of unique domains that are observed within the dataset are calculated at 1502-1503. Thereafter, for each of those domains, a unique count of IP address requests must be calculated by scanning the original dataset. Additionally, any geolocation information may also be calculated while traversing the log files for the given domains, 1504. The resulting calculations may be used inside a new data structure that represents a mapping of the unique domain names to its calculated IP hits and geo-location statistics, 1505.

At this point, the n-gram tokenization method 1506 may be run over the keys of the aforementioned map, which is a list of unique domain names observed within the dataset. The tokenization subroutine will return a set of tokens for the given domain which then will be used to construct a new data structure such as a map of lists, 1508. This new structure will contain a key entry for each token returned by the tokenization method 1506. The value for the map may include a list of domains with their corresponding hit count and geolocation data, 1509. Finally, the lists of each map entry can be sorted and written to storage.

An inverted index (also referred to as postings file or inverted file) as used according to some embodiments of the invention is an index data structure storing a mapping from content, such as words or numbers, to its locations in a database file, or in a document or a set of documents. The purpose of an inverted index is to allow full text searches, at a cost of increased processing when a document is added to the database. See, e.g., http://en.wikipedia.org/wiki/Inverted index. See also Paul E. Black, "inverted index", in *Dictionary of Algorithms and Data Structures* [online], Paul E. Black, ed., *U.S. National Institute of Standards and Technology*. 14 Aug. 2008. (accessed Apr. 13, 2010) Available from: http://www.itl.nist.gov/div897/sqg/dads/HTML/invertedIndex.html.

A suitable program could support multiple ways of sorting the data and ranking the matching records. The flow charts depicted focus on a key concept of using "unique visitors" to create a measure of "demand". However, there could also be alternative methods of and criteria for sorting the records such as keyed to domain length. As used herein, a unique visitor is a statistic describing a unit of traffic to a Web site (or in our case domains), counting each visitor only once in the time frame of the report. This statistic is relevant to site publishers and advertisers (or in our case domain purchasers) as a measure of a site's true audience size, equivalent to the term "Reach" used in other media. See, e.g., Wikipedia http://en.wikipedia.org/wiki/Unique_visitor. There is also a precedence set for ranking registered domains in this type of fashion.

Referring again to FIG. 15, creating an inverted index may include receiving one or more of requests to resolve a plurality of textual identifiers such as domains in log 1501. In the present example, log 1501 included requests to resolve unresolvable textual identifiers, such as NXDomains. Note that, although the present example uses unresolvable textual identifiers as the object of a search, other data set may be targeted. A unique identifier set 1503 of unique unresolvable textual identifiers is identified in log 1501 at step 1502. At step 1504, log 1501 is parsed for each identifier within identifier set 1503 and numbers of unique requests for each textual identifier are counted and geolocation information based on auxiliary identifiers (e.g., IP addresses) associated with each of the textual identifiers is retrieved to populate a first mapping 1505 of unique identifiers to their corresponding unique requests and, as applicable, aggregated geolocation information. At step 1506, tokenizing is performed to create list 1507 including tokens (e.g., n-grams) for each of the unique identifiers contained within first mapping 1505. At step 1508, the tokens (i.e., T1, T2, ... Tx in FIG. 15) are mapped to corresponding unique unresolvable textual identifiers to populate a second mapping 1509 of tokens to a list of unique unresolvable textual identifiers with their corresponding number of unique requests and aggregated geolocation information. Second mapping 1509 is then sorted according to numbers of unique requests associated with each of the tokens (e.g., by demand or popularity.)

Figure 16:
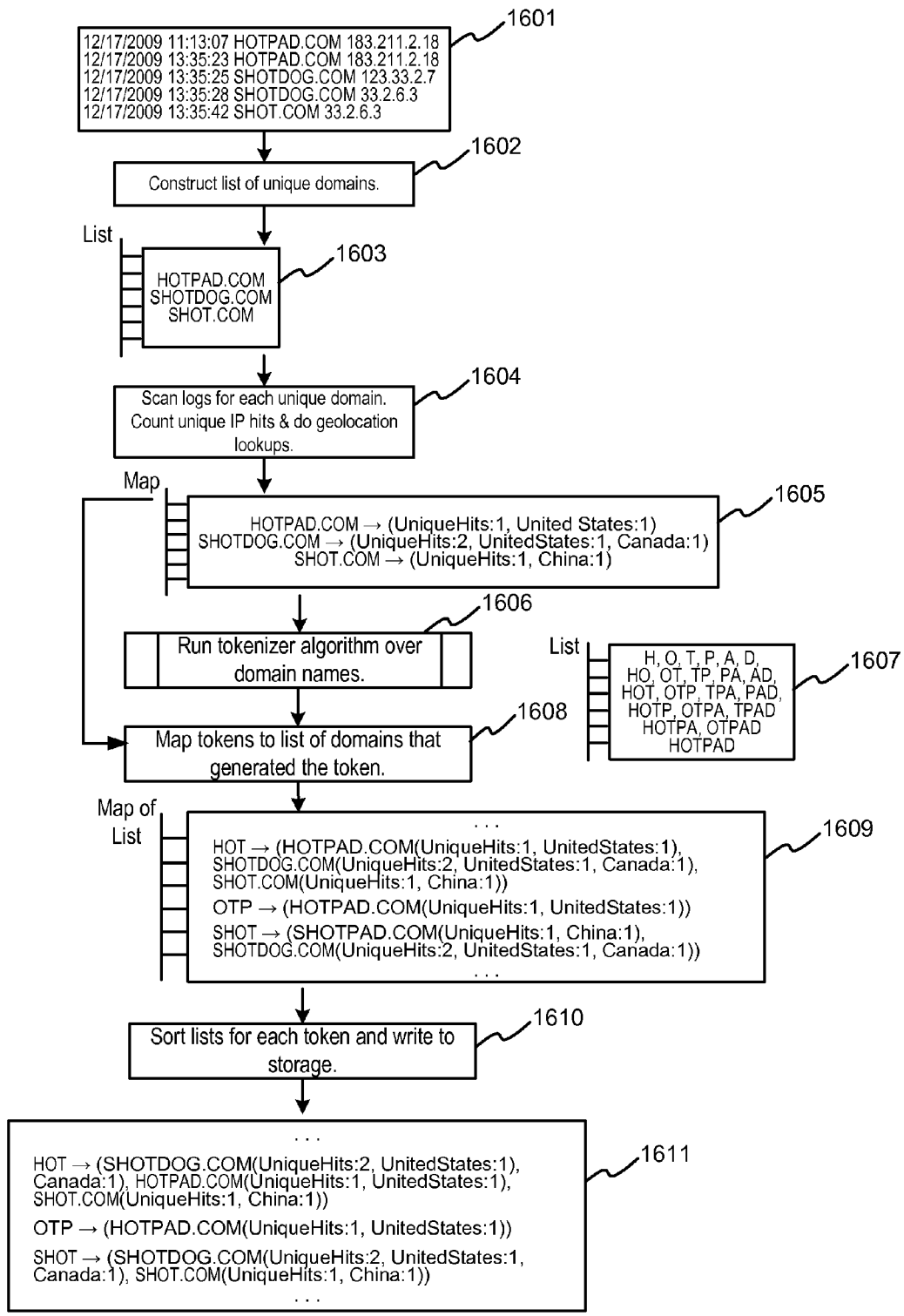
FIG. 16 is a diagram of an embodiment of the Build Index subroutine using example NXDomains of HOTPAD.COM, SHOTDOG.COM and SHOT.COM.

FIG. 16 is a diagram of an embodiment of the Build Index subroutine described immediately above using example NXDomains of HOTPAD.COM, SHOTDOG.COM and SHOT.COM.

Figure 17:
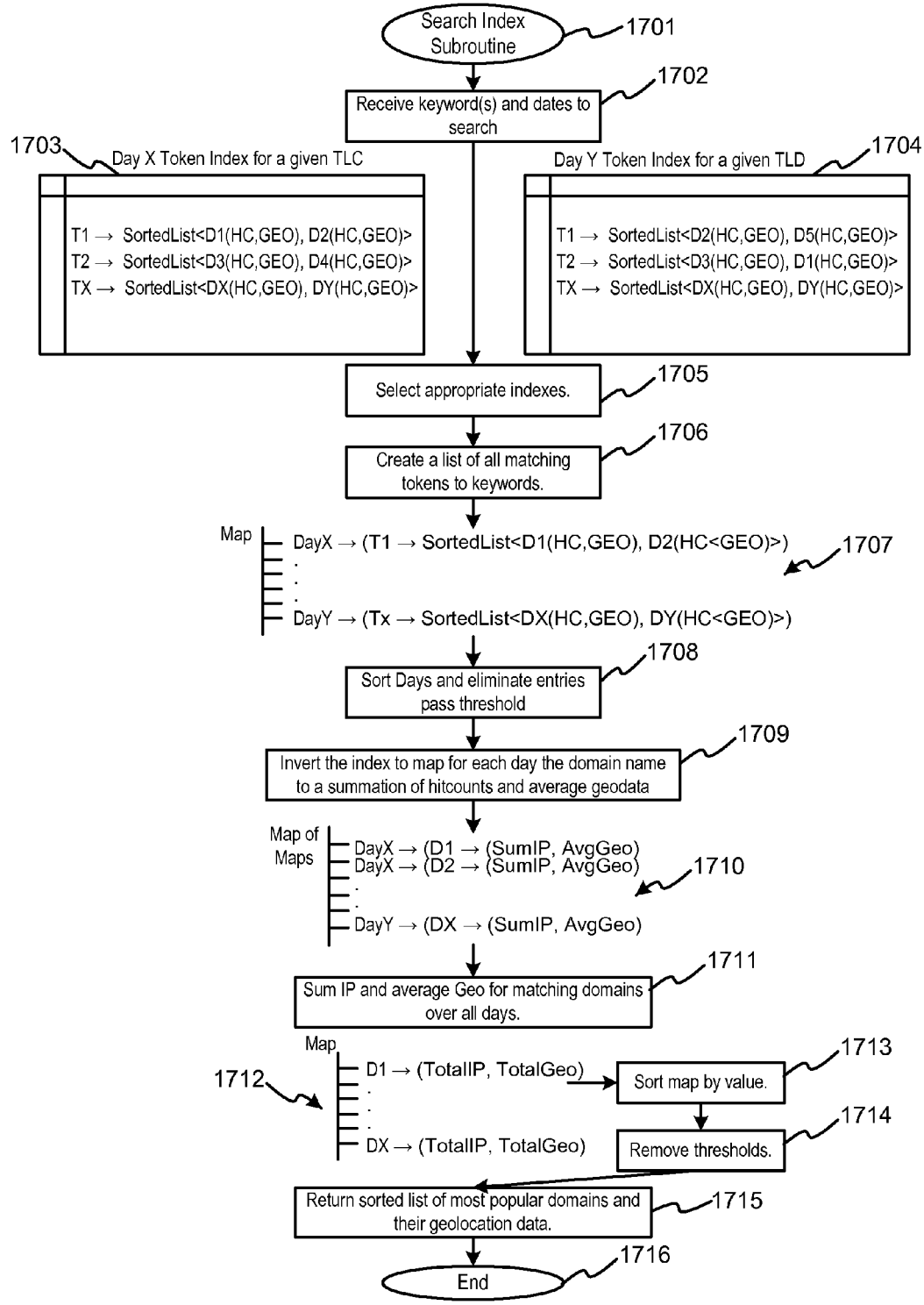
FIG. 17 is a diagram of an embodiment of the Search Index subroutine.

FIG. 17 illustrates a method using a DSEP system to implement the aforementioned inverted indexes to perform retrieval over multiple days and to rank the data accordingly. The input to this subroutine is a keyword(s) and a set of dates issued by the calling DSEP program. The program accepts the dates specified and retrieves the inverted indexes that match for a given TLD (see 1704-1705.) The token that is specified in 1702 is then searched for in each of the retrieved indexes 1704 and a resulting map is created at 1707. The map follows a structure in which the key of the map is the date from which the record matched was retrieved while the corresponding value is the data retrieved from that day's index for the given keyword (see 1707.)

The concept of inverting the index is used to change the mapping from date to a list of domains with data. The resulting operation of step 1711 takes domains that occur within the daily lists and make them keys within a new map structure. Their corresponding values are a summation of all values for that domain occurring over the time period (1712.) This map is then sorted by values and any additional thresholds can be applied. The sorted list is then returned. This method is also know as index merging wherein an inverted index is filled via a merge or rebuild. A rebuild is similar to a merge but first deletes the contents of the inverted index. The architecture may be designed to support incremental indexing, where a merge identifies the document or documents to be added or updated and then parses each document into words. For technical accuracy, a merge conflates newly indexed documents, typically residing in virtual memory, with the index cache residing on one or more computer hard drives.

After parsing, the indexer adds the referenced document to the document list for the appropriate words. In a larger search engine, the process of finding each word in the inverted index (in order to report that it occurred within a document) may be too time consuming, and so this process is commonly split up into two parts, the development of a forward index and a process which sorts the contents of the forward index into the inverted index. The inverted index is so named because it is an inversion of the forward index.

Referring again to FIG. 17, a keyword (e.g., hot) and, optionally, additional parameters (e.g., a date range) are received at 1702. Based on the optional parameters, in this example a date range, corresponding indexes (1703, 1704) of tokens are selected at step 1705. At step 1706, the selected indices (1703, 1704) are searched for tokens (t1) matching the keyword (e.g., hot) to populate a first mapping 1707 of dates (Day X, Day Y) within the date range to matching lists (e.g., SortedList<D1(HC,GEO), D2(HC,GEO)>) of matching identifiers present in the selected corresponding indices 1703, 1704. Mapping 1707 is sorted at step 1708 according to the dates within the date range and potential matches that fail to satisfy a criterion are eliminated. First mapping 1707 is inverted at step 1709 to populate a second mapping 1710 of unique identifiers (e.g., D1(HC,GEO) and D2((HC,GEO)) to corresponding unique requests and aggregated geolocation information. At step 1711, for each day in mapping (1710), counts of numbers of unique requests for each identifier are summed as is also aggregate geolocation information into a third mapping 1712 of unique identifiers and their associated summed requests and aggregated geolocation data. Third mapping 1712 is sorted according to the summed requests and aggregated geolocation data at step 1713 and potential matches that fail to satisfy a criterion are eliminated at step 1714. At step 1712 display list is returned including sorted mapping of the third mapping.

Figure 18:
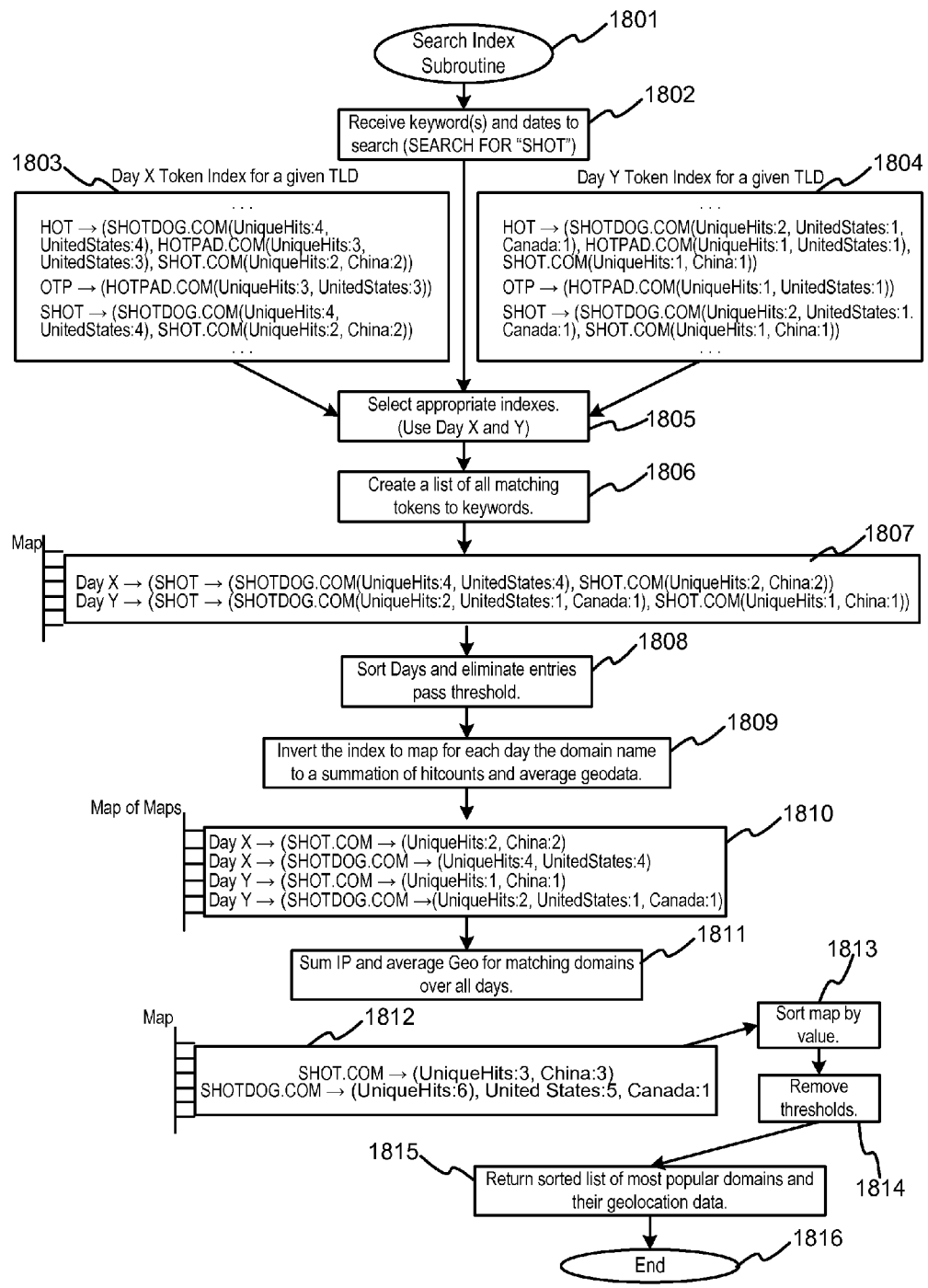
FIG. 18 is a diagram of an embodiment of the Search Index subroutine using example NXDomains of HOTPAD.COM, SHOTDOG.COM and SHOT.COM and a search term of SHOT.

FIG. 18 is a diagram of an embodiment of the Search Index subroutine described immediately above using example NXDomains of HOTPAD.COM, SHOTDOG.COM and SHOT.COM and a search term of SHOT.

Figure 19:
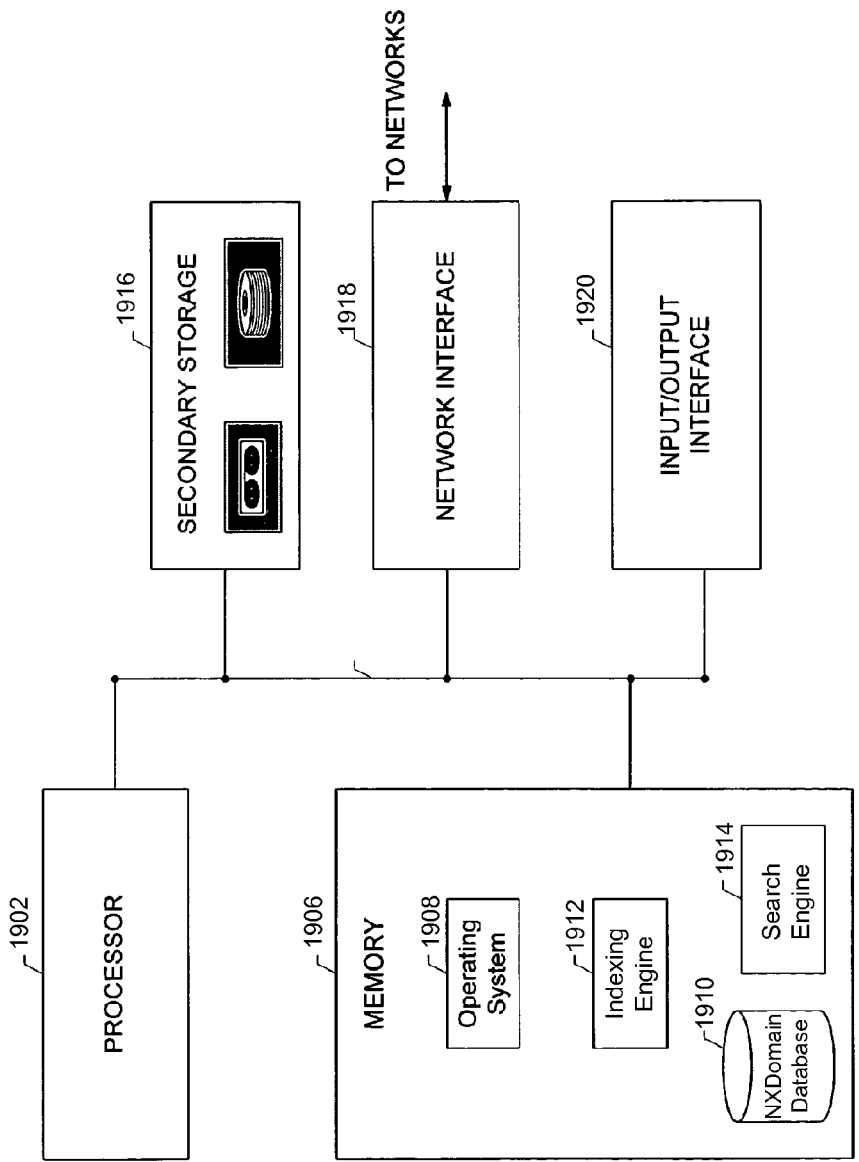
FIG. 19 is an exemplary block diagram of a computer supporting a Domain Search Engine Provider system computer in accordance with methods and system consistent with the present invention.
Figure 20:
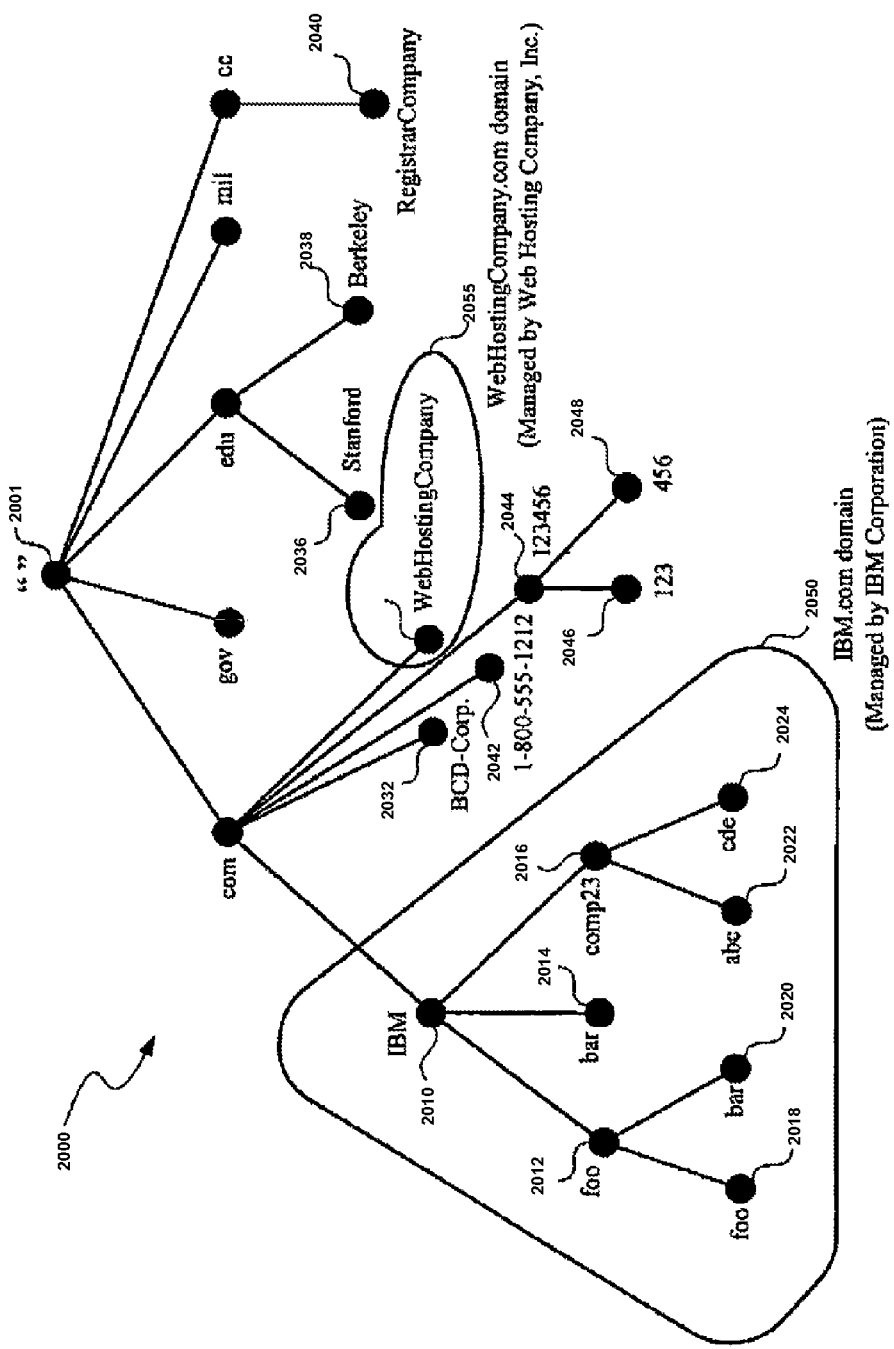
FIG. 20 is a network diagram illustrating interconnected network devices and Domain Name System (DNS) information.

FIG. 19 is an exemplary block diagram of DSEP system computer 1900, in accordance with methods and systems consistent with the present invention. DSEP system computer 1900 may comprise a processor 1902, which connects via a bus 1904 to a memory 1906, a secondary storage 1916, a network interface 1918, and an input/output interface 1920.

Memory 1906 may include an operating system 1908, a NXDomain database or log 1910, an indexing engine 1912, and a search engine 1914. Memory 1906 may also include a relational database management system, such as Oracle 8i version 8.1.6 available from Oracle Corporation.

Operating system 1908 may include, for example, the Solaris operating system. Database 1910 may include any type of database, such as the Oracle 8i database. Each record in database 1910 may include domain name information along with an associated unique identifier. Update process 1912 may include stored instructions in the form of software, which are executed by processor 1902. Indexing engine 1912 may read log files included in NXDomain database 1910 and organize the files by creating an inverted index in accordance with methods and embodiments of the present invention. Search engine 1914 may retrieve information from NXDomain database 1910 in response to requests received from other computers, such as requests for domain names incorporating some text string and may send the retrieved NXDomain to those computers. Secondary storage 1916 may comprise a computer readable medium, such as a disk drive and a tape drive. From the tape drive, software and data may be loaded onto the disk drive, which can then be copied into memory 1906. Similarly, software and data in memory 1906 may be copied onto the disk drive, which can then be loaded onto the tape drive.

Network interface 1918 may transmit messages from DSEP system computer 1906 to other computers, such as a user or registrar computer and receive messages addressed to DSEP system computer 1906 from other computers, for example, via a network such as the Internet. Input/Output interface 1920 may include, for example, a keyboard or a keypad and a display unit.

The above-noted features, other aspects, and principles of the present invention may be implemented in various system or network configurations to log, build a searchable index of, search and provide results in connection with data such as NXDomains. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, it will be apparent to those skilled in the art that various modifications and variations can be made in the system and method of the present invention and in construction of this invention without departing from the scope or spirit of the invention.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of identifying a set of textual identifiers comprising:
    maintaining a log of requests for a predetermined date range to resolve unresolvable textual identifiers in one or more domain name requests, wherein the log comprises geolocation information for each request in the log;
    identifying a set of unique unresolvable textual identifiers based on the log;
    determining a number of requests for each unique textual identifier in the log;
    creating a first association between each unique unresolvable textual identifier and one or more requests corresponding to each unique unresolvable textual identifier;
    creating one or more tokens for each of the unique unresolvable textual identifiers contained within the first association;
    creating a second association between the one or more tokens and each unique unresolvable textual identifier for which the one more tokens were created by inverting the first association, wherein the second association comprises the number of the requests and geolocation information corresponding to each request; and
    sorting the second association according to the number of the requests associated with each of the one or more tokens,
    wherein each of the unique unresolvable textual identifiers comprises a sequence of symbols, wherein each of the one or more tokens comprises an n-gram, and wherein the n-gram is a subsequence of n items from the sequence of symbols forming each of the unique unresolvable textual identifiers.

2. The computer-implemented method of claim 1 further comprising:
    receiving a plurality of the requests, each of the plurality of requests comprising a request to resolve an unresolvable textual identifier.

3. The computer-implemented method of claim 1 wherein each of the unresolvable textual identifiers comprises an address on a network.

4. The computer-implemented method of claim 1 wherein each of the unresolvable textual identifiers comprises a Uniform Resource Identifier (URI).

5. The computer-implemented method of claim 1 wherein each of the unresolvable textual identifiers comprises a Uniform Resource Locator (URL).

6. The computer-implemented method of claim 1 wherein the creating the first association further includes:
    retrieving the geolocation information based on auxiliary identifiers associated with each of the textual identifiers;
    aggregating the geolocation information that is retrieved; and
    creating the first association each unique unresolvable textual identifier and the one or more requests and the geolocation information that is aggregated.

7. The computer-implemented method of claim 6 wherein the auxiliary identifiers comprise Internet Protocol (IP) addresses.

8. A data processing system for identifying a set of textual identifiers, the data processing system comprising a storage device including a storage medium, wherein the storage device stores computer usable program code; and a processor, wherein the processor executes the computer usable program code, and wherein the computer usable program code is operable to perform a method comprising:
    maintaining a log of requests for a predetermined date range to resolve unresolvable textual identifiers in one or more domain name requests, wherein the log comprises geolocation information for each request in the log;
    identifying a unique identifier set of unique unresolvable textual identifiers based on the log;
    determining a number of requests for each unique textual identifier in the log;
    creating a first association between each unique unresolvable textual identifier and one or more requests corresponding to each unique unresolvable textual identifier;
    creating one or more tokens for each of the unique unresolvable textual identifiers contained within the first association;
    creating a second association between the one or more tokens and each unique unresolvable textual identifier for which the one more tokens were created by inverting the first association, wherein the second association comprises the number of the requests and geolocation information corresponding to each request; and
    sorting the second association according to the number of the requests associated with each of the one or more tokens,
    wherein each of the unique unresolvable textual identifiers comprises a sequence of symbols, wherein each of the one or more tokens comprises an n-gram, and wherein the n-gram is a subsequence of n items from the sequence of symbols forming each of the unique unresolvable textual identifiers.

9. The data processing system of claim 8 wherein the method further comprises retrieving the geolocation information based on auxiliary identifiers associated with each of the textual identifiers; aggregating the geolocation information that is retrieved; and creating the first association each unique unresolvable textual identifier and the one or more requests and the geolocation information that is aggregated.

10. The data processing system of claim 8 wherein each of the unresolvable textual identifiers comprises a Uniform Resource Locator (URL).

* * * * *